US012701350B2

(12) United States Patent
Higgins et al.

(10) Patent No.: US 12,701,350 B2
(45) Date of Patent: Aug. 4, 2026

(54) HEARING DEVICE

(71) Applicant: Starkey Laboratories, Inc., Eden Prairie, MN (US)

(72) Inventors: Sidney A. Higgins, Maple Grove, MN (US); David Tourtelotte, Eden Prairie, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 452 days.

(21) Appl. No.: 18/121,325

(22) Filed: Mar. 14, 2023

(65) Prior Publication Data

US 2023/0300509 A1 Sep. 21, 2023

Related U.S. Application Data

(60) Provisional application No. 63/401,845, filed on Aug. 29, 2022, provisional application No. 63/320,017, filed on Mar. 15, 2022.

(51) Int. Cl.

| | |
|---|---|
| ***H04R 1/10*** | (2006.01) |
| ***H04R 1/02*** | (2006.01) |
| ***H04R 1/08*** | (2006.01) |
| ***H04R 1/28*** | (2006.01) |

(52) U.S. Cl.
CPC ............. *H04R 1/1083* (2013.01); *H04R 1/02* (2013.01); *H04R 1/08* (2013.01); *H04R 1/083* (2013.01); *H04R 1/1016* (2013.01); *H04R 1/2869* (2013.01); *H04R 2460/01* (2013.01)

(58) Field of Classification Search
CPC .......... H04R 1/1083; H04R 1/02; H04R 1/08; H04R 1/083; H04R 1/1016; H04R 1/2869; H04R 2460/01; H04R 25/604; H04R 2225/0216; H04R 25/456
See application file for complete search history.

(56) References Cited

U.S. PATENT DOCUMENTS

| | | | | |
|---|---|---|---|---|
| 4,588,867 | A | 5/1986 | Konomi | |
| 5,295,193 | A | 3/1994 | Ono | |
| 5,373,555 | A | 12/1994 | Jabra | |
| 6,574,345 | B1 * | 6/2003 | Huang ................ | H04R 1/1016 379/430 |

(Continued)

FOREIGN PATENT DOCUMENTS

| | | |
|---|---|---|
| DE | 102022206012 | 12/2023 |
| EP | 0092822 | 7/1989 |

(Continued)

OTHER PUBLICATIONS

European Patent Application No. 23161916.4, filed Mar. 14, 2023, European Search Report issued Jul. 18, 2023, 10 pages.

*Primary Examiner* — Gerald Gauthier
(74) *Attorney, Agent, or Firm* — Mueting Raasch Group

(57) ABSTRACT

Various embodiments of a hearing device and a system including such device are disclosed. The hearing device includes an enclosure having a front housing and a rear housing, and an isolator disposed between the front housing and the rear housing, where the isolator includes a body and a sleeve disposed on a side surface of the body. A second end of the front housing and a second end of the rear housing are connected to the sleeve of the isolator. The device also includes a microphone disposed in the rear housing and a receiver disposed in the front housing.

20 Claims, 7 Drawing Sheets

(56) References Cited

U.S. PATENT DOCUMENTS

| | | | | |
|---|---|---|---|---|
| 6,643,378 | B2 * | 11/2003 | Schumaier | H04R 25/606 381/328 |
| 8,331,593 | B2 | 12/2012 | Slemming | |
| 8,494,193 | B2 | 7/2013 | Zhang | |
| 8,625,827 | B2 | 1/2014 | Gudmundsen | |
| 8,958,586 | B2 | 2/2015 | Preves | |
| 9,002,045 | B2 | 4/2015 | Merks | |
| 9,042,586 | B2 | 5/2015 | Burns | |
| 9,197,970 | B2 | 11/2015 | Zhang | |
| 9,264,824 | B2 | 2/2016 | Pruthi | |
| 9,294,849 | B2 | 3/2016 | Burns | |
| 9,641,942 | B2 | 5/2017 | Strelcyk | |
| 9,699,573 | B2 | 7/2017 | Merks | |
| 9,940,928 | B2 | 4/2018 | Haubrich | |
| 9,949,041 | B2 | 4/2018 | Liao | |
| 9,980,065 | B2 | 5/2018 | Higgins | |
| 10,129,664 | B2 | 11/2018 | Fitz | |
| 10,616,680 | B2 * | 4/2020 | Bolsman | H04R 1/08 |
| 10,674,285 | B2 | 6/2020 | Walsh | |
| 11,136,866 | B2 | 10/2021 | Holodnak | |
| 11,323,828 | B2 | 5/2022 | Roug | |
| 11,533,573 | B2 * | 12/2022 | Houcek | H04R 25/48 |
| 11,582,550 | B1 * | 2/2023 | Dominijanni | H04R 1/2826 |
| 11,659,343 | B2 * | 5/2023 | Dickinson | H04R 25/505 381/322 |
| 12,233,264 | B2 | 2/2025 | Griffin | |
| 12,477,267 | B2 | 11/2025 | Higgins | |
| 2001/0036289 | A1 | 11/2001 | Nepomuceno | |
| 2002/0122563 | A1 | 9/2002 | Schumaier | |
| 2007/0036379 | A1 * | 2/2007 | Anderson | H04R 25/656 381/328 |
| 2008/0205679 | A1 * | 8/2008 | Darbut | H04R 25/554 381/328 |
| 2009/0245558 | A1 * | 10/2009 | Spaulding | H04R 25/656 381/328 |
| 2010/0124346 | A1 * | 5/2010 | Higgins | H04R 25/02 439/86 |
| 2014/0301585 | A1 | 10/2014 | Baer | |
| 2016/0183012 | A1 | 6/2016 | Pedersen | |
| 2017/0055087 | A1 | 2/2017 | Racca | |
| 2017/0289666 | A1 * | 10/2017 | Pejaudier | H04R 1/105 |
| 2018/0160208 | A1 * | 6/2018 | Lee | H04R 1/1083 |
| 2018/0176676 | A1 * | 6/2018 | Tiefenau | H04R 25/456 |
| 2018/0336914 | A1 | 11/2018 | Staton | |
| 2019/0022349 | A1 | 1/2019 | Kirszenblat | |
| 2019/0214038 | A1 * | 7/2019 | Bouserhal | G10L 25/84 |
| 2020/0152227 | A1 | 5/2020 | Xiang | |
| 2020/0205745 | A1 | 7/2020 | Khosousi | |
| 2020/0213787 | A1 * | 7/2020 | Houcek | H04R 1/1075 |
| 2020/0219506 | A1 | 7/2020 | Bhowmik | |
| 2020/0219515 | A1 | 7/2020 | Bhowmik | |
| 2020/0245938 | A1 | 8/2020 | Xu | |
| 2020/0268265 | A1 | 8/2020 | Walsh | |
| 2020/0268315 | A1 | 8/2020 | Burwinkel | |
| 2020/0322712 | A1 * | 10/2020 | Williams | G10K 11/17875 |
| 2021/0044909 | A1 | 2/2021 | Higgins | |
| 2021/0127216 | A1 | 4/2021 | Usher | |
| 2021/0211817 | A1 * | 7/2021 | Lindberg | H04R 25/652 |
| 2022/0053259 | A1 | 2/2022 | Daley | |
| 2022/0167100 | A1 * | 5/2022 | Kelly | H04R 1/1083 |
| 2022/0303697 | A1 | 9/2022 | Zhang | |
| 2022/0335924 | A1 | 10/2022 | Qin | |
| 2023/0022584 | A1 * | 1/2023 | Kelly | H04R 1/2807 |
| 2023/0134787 | A1 | 5/2023 | Chen | |
| 2023/0210400 | A1 | 7/2023 | Vastare | |
| 2023/0224653 | A1 | 7/2023 | Jin | |
| 2023/0300509 | A1 | 9/2023 | Higgins | |
| 2023/0300517 | A1 * | 9/2023 | Higgins | H04R 1/1083 381/71.6 |
| 2023/0397830 | A1 | 12/2023 | Gokay | |

FOREIGN PATENT DOCUMENTS

| | | |
|---|---|---|
| EP | 2613566 | 7/2016 |
| EP | 3627858 | 3/2023 |
| WO | WO 2021138647 A1 | 7/2021 |
| WO | WO 2021138648 A1 | 7/2021 |
| WO | WO 2023283569 A1 | 1/2023 |

* cited by examiner

HEARING DEVICE

This application claims the benefit of U.S. Provisional Application No. 63/320,017, filed Mar. 15, 2022; and U.S. Provisional Application No. 63/401,845, filed Aug. 29, 2022, the disclosures of which are incorporated by reference herein in their entireties.

BACKGROUND

Hearing devices that are disposed in an ear of a wearer or inserted into an opening of an ear canal of the wearer typically include a housing or shell with electronic components such as a receiver (i.e., speaker) disposed within the housing. The receiver is adapted to provide acoustic information in the form of acoustic energy to the wearer's ear canal from a controller either disposed within the housing of the hearing device or connected to the hearing device by a wired or wireless connection. This acoustic information can include music or speech from a recording or other source. In hearing devices such as hearing assistance devices, the acoustic information provided to the wearer can include ambient sounds such as speech from a person or persons that are speaking in proximity to the wearer. Such speech can be amplified so that the wearer can better hear the speaker. Some hearing devices also include a microphone disposed within the housing. Such microphone can be utilized to detect the wearer's voice and provide a microphone signal to the receiver, which in turn provides acoustic energy to the ear that includes an amplified version of the wearer's voice.

SUMMARY

In general, the present disclosure provides various embodiments of a hearing device and a system that includes such device. The hearing device includes an enclosure having a front housing and a rear housing. An isolator is disposed between the front and rear housings. The isolator can include a body and a sleeve disposed on the body. The device further includes a microphone disposed in the rear housing and a receiver disposed in the front housing. A microphone port extends between an inlet disposed in the rear housing and an outlet that is acoustically connected to an inlet of the microphone. In one or more embodiments, the isolator can be adapted to reduce vibrations caused by the receiver that can affect a microphone signal produced by the microphone.

In one aspect, the present disclosure provides a hearing device that includes an enclosure extending along an enclosure axis and including a front housing and a rear housing, where the front housing extends along the enclosure axis between a first end and a second end. The first end is adapted to be disposed at least partially within an ear canal of a wearer, and the rear housing extends along the enclosure axis between a first end and a second end. The hearing device further includes an isolator disposed between the front housing and the rear housing, where the isolator includes a body and a sleeve disposed on a side surface of the body. The second end of the front housing and the second end of the rear housing are connected to the sleeve of the isolator. The device also includes a microphone disposed in the rear housing and a microphone port extending between an inlet disposed in the rear housing and an outlet that is acoustically connected to an inlet of the microphone. The device further includes a receiver disposed in the front housing and an acoustic port extending between the receiver and an opening disposed in the first end of the front housing. The acoustic port acoustically connects the receiver to the opening.

In another aspect, the present disclosure provides a hearing device system that includes a hearing device, a hearing module, and a cable that connects the hearing device to the hearing module. The hearing device includes an enclosure extending along an enclosure axis and including a front housing and a rear housing, where the front housing extends along the enclosure axis between a first end and a second end, where the first end is adapted to be disposed at least partially within an ear canal of a wearer, and further where the rear housing extends along the enclosure axis between a first end and a second end. The hearing device further includes an isolator disposed between the front housing and the rear housing, where the isolator includes a body and a sleeve disposed on a side surface of the body, where the second end of the front housing and the second end of the rear housing are connected to the sleeve of the isolator. The hearing device further includes a microphone disposed in the rear housing and a microphone port extending between an inlet disposed in the rear housing and an outlet acoustically connected to an inlet of the microphone. The device also includes a receiver disposed in the front housing and an acoustic port extending between the receiver and an opening disposed in the first end of the front housing, where the acoustic port acoustically connects the receiver to the opening. Further, the hearing module is adapted to be disposed between an ear and a skull of the wearer, where the hearing module includes a module housing and electronic components disposed within the module housing.

In another aspect, the present disclosure provides a method that includes forming a body of an isolator; disposing a sleeve onto a side surface of the body of the isolator; and disposing a microphone at least partially within a rear housing, where the rear housing includes a first end and a second end. The method further includes disposing a receiver within a front housing, where the front housing includes a first end and a second end, and where the first end is adapted to be disposed at least partially within an ear canal of a wearer. The method further includes connecting the second end of the front housing to the sleeve of the isolator; and connecting the second end of the rear housing to the sleeve of the isolator, where the front housing, the isolator, and the rear housing define an enclosure that extends along an enclosure axis.

All headings provided herein are for the convenience of the reader and should not be used to limit the meaning of any text that follows the heading, unless so specified.

The terms "comprises" and variations thereof do not have a limiting meaning where these terms appear in the description and claims. Such terms will be understood to imply the inclusion of a stated step or element or group of steps or elements but not the exclusion of any other step or element or group of steps or elements. The term "consisting of" means "including," and is limited to whatever follows the phrase "consisting of." Thus, the phrase "consisting of" indicates that the listed elements are required or mandatory and that no other elements may be present. The term "consisting essentially of" means including any elements listed after the phrase and is limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

In this application, terms such as "a," "an," and "the" are not intended to refer to only a singular entity but include the general class of which a specific example may be used for having Illustration. The terms "a," "an," and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

These and other aspects of the present disclosure will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

Throughout the specification, reference is made to the appended drawings, where like reference numerals designate like elements, and wherein.

DETAILED DESCRIPTION

Figure 1:
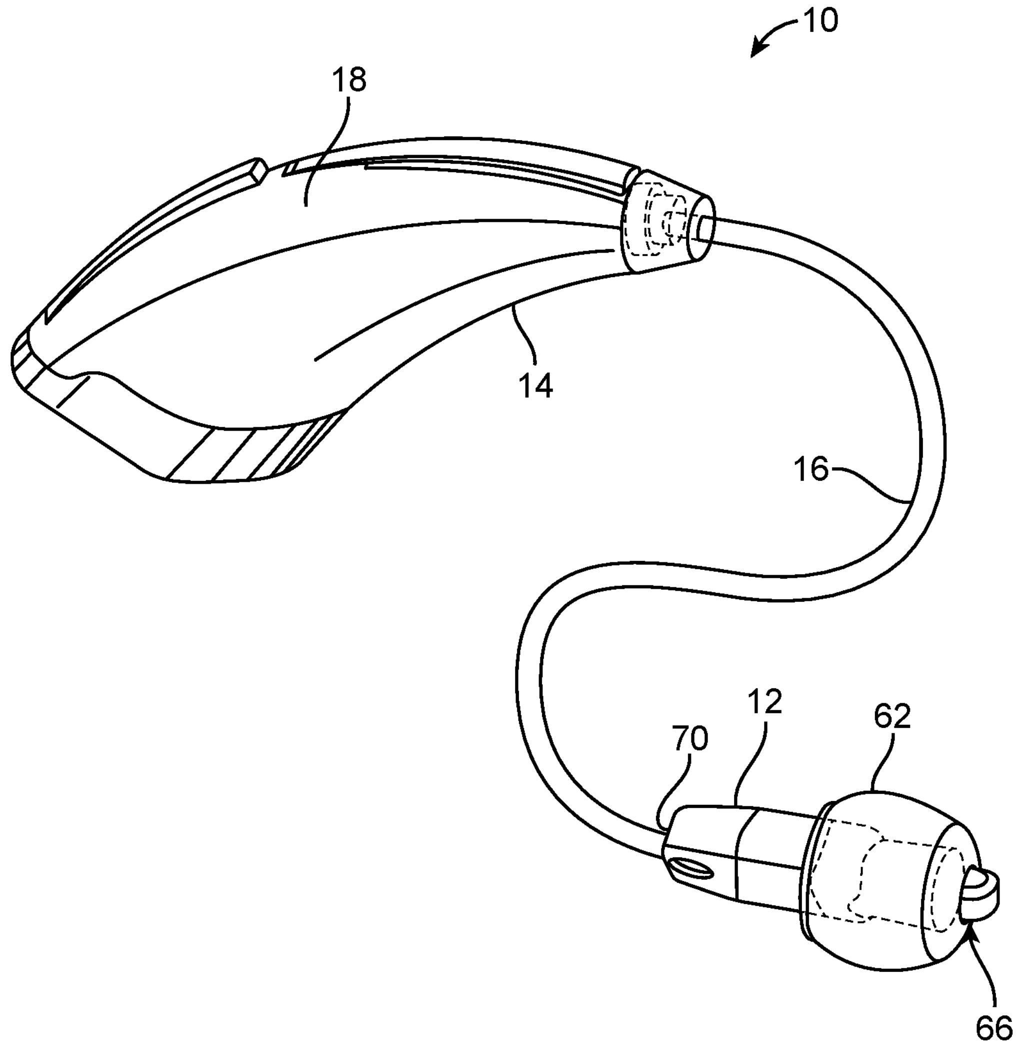
FIG. 1 is a schematic perspective view of one embodiment of a hearing device system that includes a hearing device and a hearing module connected to the hearing device by a cable.

In general, the present disclosure provides various embodiments of a hearing device and a system that includes such device. The hearing device includes an enclosure having a front housing and a rear housing. An isolator is disposed between the front and rear housings. The isolator can include a body and a sleeve disposed on the body. The device further includes a microphone disposed in the rear housing and a receiver disposed in the front housing. A microphone port extends between an inlet disposed in the rear housing and an outlet that is acoustically connected to an inlet of the microphone. In one or more embodiments, the isolator can be adapted to reduce vibrations caused by the receiver that can affect a microphone signal produced by the microphone.

Currently-available in-ear hearing devices that include a microphone disposed within a housing of the device can suffer from vibrations from the receiver that can be picked up by the microphone, thereby reducing a signal to noise ratio of the microphone signal. These receiver vibrations can either be directly from the receiver or from the housing that vibrates in response to the receiver or from other sources.

One or more embodiments of hearing devices described herein can exhibit various advantages over known hearing devices. For example, the isolator that is disposed between the front and rear housings can reduce vibrations from the receiver and the enclosure. Such vibration reduction can enable placement of the microphone inside the rear housing without an increase in noise in the microphone signal that can be caused by vibration of the receiver. The isolator can include a body and a sleeve disposed on the body. In one or more embodiments, the sleeve can be over-molded onto the body, which can enhance robustness of the isolator and the enclosure of the device and increase manufacturability of the device.

Embodiments of the disclosure are defined in the claims; however, herein there is provided a non-exhaustive listing of non-limiting examples. Any one or more of the features of these examples may be combined with any one or more features of another example, embodiment, or aspect described herein.

Example Ex1. A hearing device that includes an enclosure extending along an enclosure axis and including a front housing and a rear housing, where the front housing extends along the enclosure axis between a first end and a second end. The first end is adapted to be disposed at least partially within an ear canal of a wearer, and the rear housing extends along the enclosure axis between a first end and a second end. The hearing device further includes an isolator disposed between the front housing and the rear housing, where the isolator includes a body and a sleeve disposed on a side surface of the body. The second end of the front housing and the second end of the rear housing are connected to the sleeve of the isolator. The device also includes a microphone disposed in the rear housing and a microphone port extending between an inlet disposed in the rear housing and an outlet that is acoustically connected to an inlet of the microphone. The device further includes a receiver disposed in the front housing and an acoustic port extending between the receiver and an opening disposed in the first end of the front housing. The acoustic port acoustically connects the receiver to the opening.

Example Ex2. The device of Ex1, where the sleeve is over-molded onto the side surface of the body of the isolator.

Example Ex3. The device of one or more of Ex1 to Ex2, where the isolator further includes a flange that extends from the side surface, where the sleeve is in contact with the flange.

Example Ex4. The device of Ex3, where the sleeve includes a first portion that is connected to the front housing and a second portion that is connected to the rear housing, where the flange is disposed between the first portion and the second portion of the sleeve.

Example Ex5. The device of one or more of Ex1 to Ex4, where the body of the isolator includes at least one of a thermoplastic polymer, thermoset polymer, thermoplastic elastomer, or photopolymer.

Example Ex6. The device of one or more of Ex1 to Ex5, where the body of the isolator includes a hardness value of at least 20 durometer Shore OO.

Example Ex7. The device of one or more of Ex1 to Ex6, where the body of the isolator includes a hardness value of no greater than 80 durometer Shore A.

Example Ex8. The device of one or more of Ex1 to Ex7, where a hardness value of the sleeve of the isolator is greater than a hardness value of the body of the isolator.

Example Ex9. The device of one or more of Ex1 to Ex8, further including an earbud connected to the first end of the front housing.

Example Ex10. The device of Ex9, where the front housing includes a concentric flange disposed on an outer surface of the front housing, where the concentric flange is adapted to engage the earbud.

Example Ex11. The device of one or more of Ex9 to Ex10, where an opening in the earbud is aligned along the enclosure axis with the opening in the first end of the front housing.

Example Ex12. The device of one or more of Ex1 to Ex11, where the sleeve of the isolator further includes a first rib that extends toward the first end of the front housing along the enclosure axis, where the first rib is adapted to be inserted into the second end of the front housing.

Example Ex13. The device of Ex12, where the sleeve of the isolator further includes a second rib extending toward the first end of the rear housing along the enclosure axis, where the second rib is adapted to be inserted into the first end of the rear housing.

Example Ex14. The device of Ex13, where the sleeve of the isolator further includes a ledge that extends from the first rib to a perimeter of the sleeve, where an end surface of the second end of the front housing is adapted to engage the ledge.

Example Ex15. The device of Ex14, where the sleeve of the isolator further includes a second ledge that extends from the second rib to the perimeter of the sleeve, where an end surface of the second end of the rear housing is adapted to engage the ledge.

Example Ex16. The device of one or more of Ex1 to Ex15, further including a connector port disposed in the first end of the rear housing and adapted to receive an end of a cable.

Example Ex17. A hearing device system that includes a hearing device, a hearing module, and a cable that connects the hearing device to the hearing module. The hearing device includes an enclosure extending along an enclosure axis and including a front housing and a rear housing, where the front housing extends along the enclosure axis between a first end and a second end, where the first end is adapted to be disposed at least partially within an ear canal of a wearer, and further where the rear housing extends along the enclosure axis between a first end and a second end. The hearing device further includes an isolator disposed between the front housing and the rear housing, where the isolator includes a body and a sleeve disposed on a side surface of the body, where the second end of the front housing and the second end of the rear housing are connected to the sleeve of the isolator. The hearing device further includes a microphone disposed in the rear housing and a microphone port extending between an inlet disposed in the rear housing and an outlet acoustically connected to an inlet of the microphone. The device also includes a receiver disposed in the front housing and an acoustic port extending between the receiver and an opening disposed in the first end of the front housing, where the acoustic port acoustically connects the receiver to the opening. Further, the hearing module is adapted to be disposed between an ear and a skull of the wearer, where the hearing module includes a module housing and electronic components disposed within the module housing.

Example Ex18. The system of Ex17, where the electronic components of the hearing module include a controller that is operatively connected to the hearing device.

Example Ex19. The system of Ex17, where the controller is adapted to direct a noise canceling signal to the receiver of the hearing device that is based upon a noise signal received from the microphone of the hearing device, where the receiver is adapted to direct a noise canceling acoustic wave into an ear canal of a wearer of the hearing device that is based upon the noise canceling signal from the controller.

Example Ex20. A method that includes forming a body of an isolator; disposing a sleeve onto a side surface of the body of the isolator; and disposing a microphone at least partially within a rear housing, where the rear housing includes a first end and a second end. The method further includes disposing a receiver within a front housing, where the front housing includes a first end and a second end, and where the first end is adapted to be disposed at least partially within an ear canal of a wearer. The method further includes connecting the second end of the front housing to the sleeve of the isolator; and connecting the second end of the rear housing to the sleeve of the isolator, where the front housing, the isolator, and the rear housing define an enclosure that extends along an enclosure axis.

Example Ex21. The method of Ex20, further including disposing a microphone port in the rear housing that extends between an inlet disposed in the rear housing and an outlet disposed adjacent to the microphone.

Example Ex22. The method of one or more of Ex20 to Ex21, where forming the body of the isolator includes molding the body of the isolator.

Example Ex23. The method of one or more of Ex20 to Ex22, where disposing the sleeve onto the side surface of the body of the isolator includes over-molding the sleeve onto the side surface of the body of the isolator.

FIG. 1 is a schematic perspective view of one embodiment of a hearing device system 10. The system 10 includes a hearing device 12, a hearing module 14, and a cable 16 that connects the hearing device to the hearing module. The hearing module 14 is adapted to be disposed between an ear and a skull of a wearer. As is further described herein, the hearing module 14 includes a module housing 18 and electronic components (electronic components 20 of FIG. 7) disposed within the module housing.

The hearing device 12 can include any suitable device that can provide acoustic energy to a wearer using any suitable technique, e.g., by directing sound into the ear of the wearer, bone conduction, implants, etc. In one or more embodiments, the hearing device 12 can include over-the-ear or in-ear headphones, an earpiece, etc. Further, in one or more embodiments, the system can include a hearing assistance device such as behind-the-ear (BTE), in-the-ear (ITE), in-the-canal (ITC), or completely-in-the-canal (CIC) type hearing devices. It is understood that behind-the-ear type hearing devices can reside substantially behind the ear or over the ear. Such devices can include receivers associated with an electronics portion of the behind-the-ear device, or receivers disposed in the ear canal of the user. Such devices are also known as receiver-in-the-canal (RIC) or receiver-in-the-ear (RITE) hearing devices.

Figure 2:
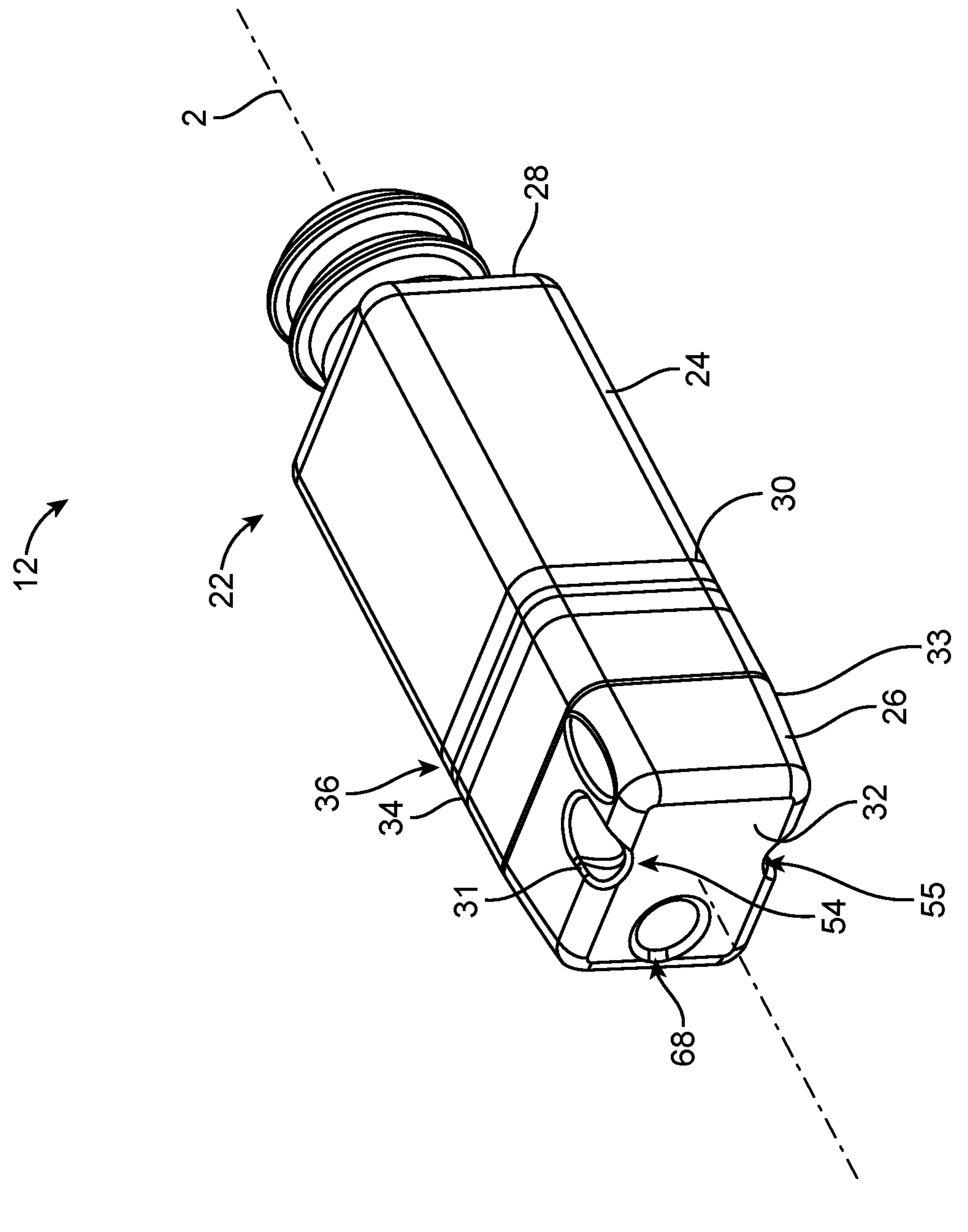
FIG. 2 is a schematic perspective view of the hearing device of FIG. 1.
Figure 3:
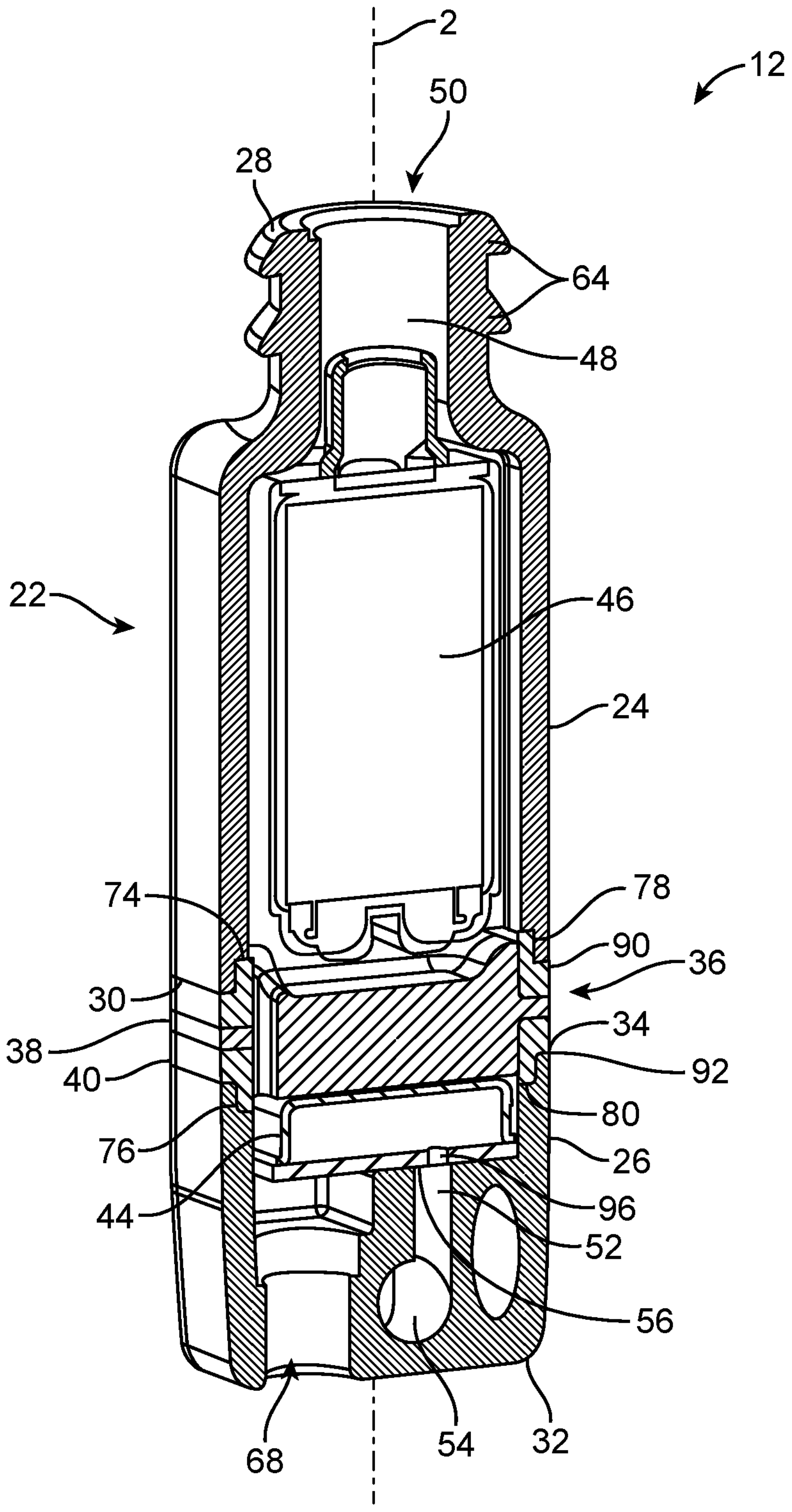
FIG. 3 is a schematic cross-section view of the hearing device of FIG. 1.

As shown in FIGS. 2-3, the hearing device 12 includes an enclosure 22 that extends along an enclosure axis 2. The enclosure 22 includes a front housing 24 and a rear housing 26. The front housing 24 extends along the enclosure axis 2 between a first end 28 and a second end 30. Further, the rear housing 26 extends along the enclosure axis 2 between a first end 32 and a second end 34.

Figure 4:
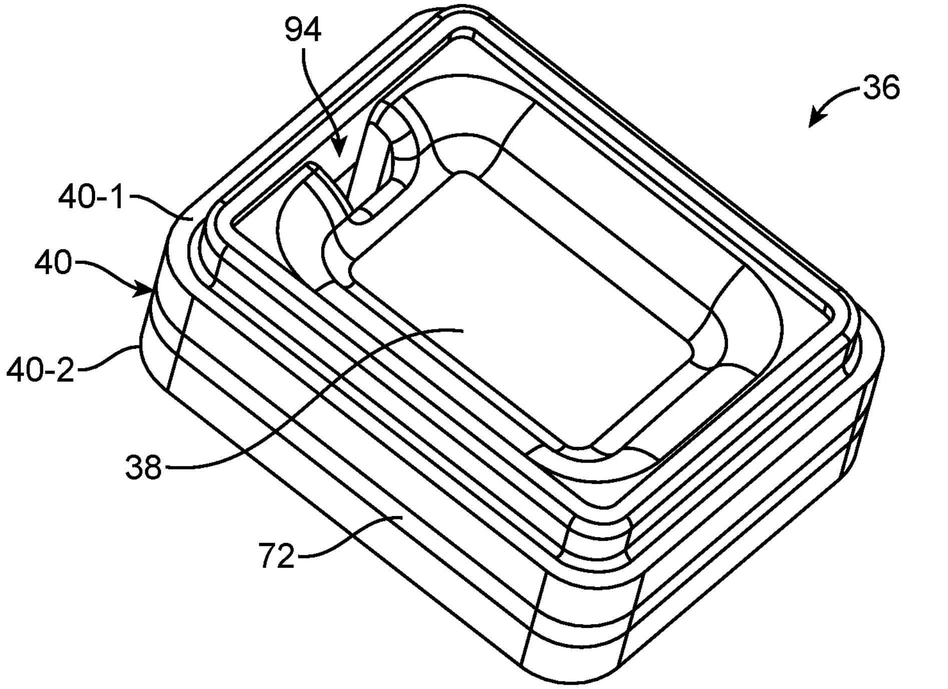
FIG. 4 is a schematic perspective view of an isolator of the hearing device of FIG. 1.

The device 12 also includes an isolator 36 disposed between the front housing 24 and the rear housing 26. The isolator 36 includes a body 38 and a sleeve 40 disposed on the body (FIG. 4). In one or more embodiments, the sleeve 40 is disposed on a side surface 42 (FIG. 6) of the body 38. The second end 30 of the front housing 24 and the second end 34 of the rear housing 26 are connected to the sleeve 40 of the isolator 36.

Any suitable electronic components can be disposed within the enclosure 22. As shown in FIG. 3, the hearing device 12 includes a sensor 44 disposed in the rear housing 26 and a receiver 46 disposed in the front housing 26. In one or more embodiments, the sensor 44 includes a microphone (referred to herein as microphone 44). Although depicted as including the microphone 44 and the receiver 46, in one or more embodiments, one or more additional components and/or circuitry can be disposed within the enclosure 22, e.g., at least one of a controller, amplifier, filter, GMR, switch, telecoil, sensor, or inward facing microphone. The device 12 further includes an acoustic port 48 that extends between the receiver 46 and an opening 50 disposed in the first end 28 of the front housing 24. The acoustic port 48 acoustically connects the receiver 46 to the opening 50, i.e., the acoustic port is adapted to direct acoustic energy between the receiver and the opening. Further, the device 12 includes a microphone port 52 that extends between an inlet 54 disposed in the rear housing 26 and an outlet 56 that is acoustically connected to an inlet 96 of the microphone 44. The microphone port 52 acoustically connects the microphone 44 to the inlet 54 of the microphone port.

Figure 7:
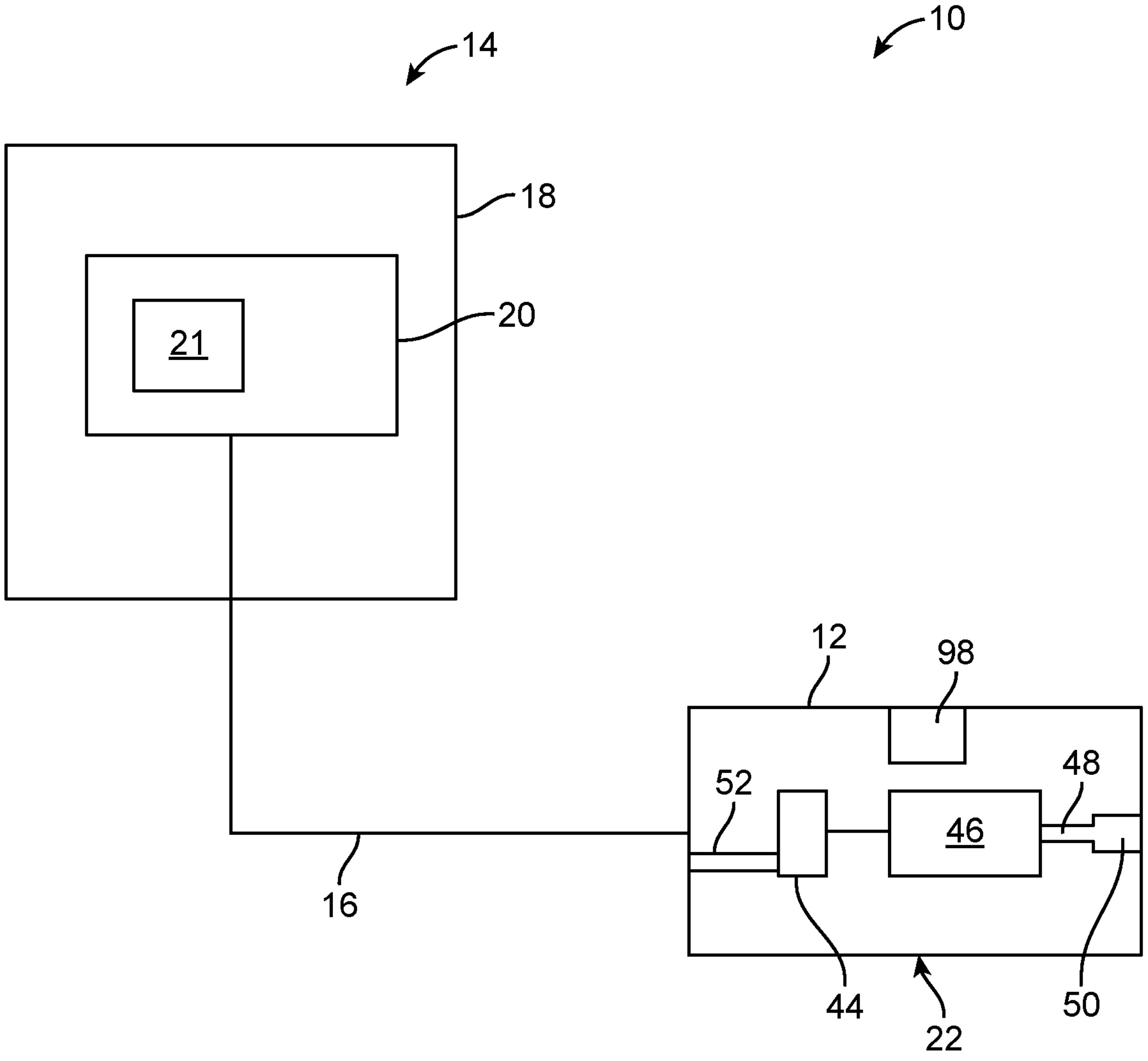
FIG. 7 is a schematic diagram of the hearing device system of FIG. 1.

The electronic components disposed within the enclosure 22 can also include one or more telecoils 98 (FIG. 7). Such telecoil 98 can be electrically connected to one or more electronic components 20 disposed within the hearing module 14 using any suitable technique, e.g., by cable 16. Any suitable telecoil 98 or antenna can be disposed within the enclosure 22. By placing the microphone 44 in a rear-facing position as shown, additional space within the enclosure 22 can be provided for additional electronic components such as telecoils 98. Further, in one or more embodiments, placement of the telecoil 98 in the hearing device 12 can provide a more reliable signal to the wearer. In one or more embodiments, one or more additional telecoils can be disposed in the hearing module 14.

The front housing 24 of the enclosure 22, which extends along the enclosure axis 2 between the first end 28 and the second end 30, can take any suitable shape and have any suitable dimensions. In one or more embodiments, the front housing 24 is sized such that at least a portion of its first end 28 can be disposed within an opening of the ear canal of the wearer. In one or more embodiments, the first end 28 of the front housing 24 is adapted to be disposed at least partially within the ear canal.

In one or more embodiments, the hearing device 12 can include an earbud 62 (FIG. 1) connected to the first end 28 of the front housing 24. The earbud 62 can take any suitable shape and having any suitable dimensions. In one or more embodiments, the earbud 62 is integral with the front housing 24, i.e., formed as a single part with the front housing during the manufacturing process. In one or more embodiments, the earbud 62 can be manufactured separately from the front housing 24 and connected to the front housing using any suitable technique. The earbud 62 includes an opening 66 that, in one or more embodiments, is aligned along the enclosure axis 2 with the opening 50 in the first end 28 of the front housing 24.

The front housing 24 can include one or more flanges 64 (FIG. 3) that are adapted to retain the earbud 62. The front housing 24 can include any suitable number of flanges 64. Further, each flange 64 can take any suitable shape and have any suitable dimensions. In one or more embodiments, one or more of the flanges 64 can be a concentric flange.

The front housing 24 can include any suitable material, e.g., at least one of a polymeric material, metallic material, or ceramic material. Suitable polymeric materials include thermoplastic polymers (e.g., thermoplastic polyurethanes, thermoplastic elastomers), thermoset polymers, photopolymers, etc. In one or more embodiments, the front housing 24 can include the same material as the rear housing 26. Further, in one or more embodiments, the front housing 24 can include the same material as the material of the body 38 of the isolator 36. Further, the front housing 24 can be manufactured utilizing any suitable technique, e.g., molding, injection molding, 3D printing, die-casting, metal injection molding, sintering, stamping, casting, etc.

As mentioned herein, the rear housing 26 of the enclosure 22 extends along the enclosure axis 2 between the first end 32 and the second end 34. The rear housing 26 can take any suitable shape have any suitable dimensions. Further, the rear housing 26 can include any suitable material, e.g., at least one of a polymeric material, metallic material, or ceramic material. Suitable polymeric materials include thermoplastic polymers (e.g., thermoplastic polyurethanes, thermoplastic elastomers), thermoset polymers, photopolymers, etc. In one or more embodiments, the rear housing 26 can include the same material as the front housing 24. Further, in one or more embodiments, the rear housing 26 can include the same material as the material of the body 38 of the isolator 36. Further, the rear housing 26 can be manufactured utilizing any suitable technique, e.g., molding, injection molding, 3D printing, die-casting, metal injection molding, sintering, stamping, casting, etc.

The rear housing 26 can include a connector port 68 disposed in the first end 32 of the rear housing that extends between the first end and the microphone 44 disposed within the rear housing. The connector port 68 can be adapted to receive an end 70 of cable 16 (FIG. 1) that connects the hearing device 12 to the hearing module 14 such that the cable can connect the receiver 46, the microphone 44, and any other circuitry disposed within the enclosure 22 to circuitry disposed within the hearing module 14. In one or more embodiments, the connector port 68 can extend through the isolator 36 such that the cable 16 can be electrically connected to the receiver 46.

The front housing 24 and the rear housing 26 can be connected using any suitable technique to provide the enclosure 22. For example, the isolator 36 can be disposed between the front housing 24 and the rear housing 26, where the front housing and the rear housing are connected to the isolator. The second end 30 of the front housing 24 and the second end 34 of the rear housing 26 can be connected to the isolator 36 using any suitable technique, e.g., bonding, adhering including adhesive bonding and adhesive tapes, welding, friction-fitting, snap fitting, etc. The front and rear housings 24, 26 can be connected to any suitable portion or portions of the isolator 36. In one or more embodiments, one or both of the front housing 24 and rear housing 26 can be removably connected to the isolator 36 such that front and rear housings can be replaced. Such removable connection between the front and rear housings 24, 26 and the isolator 36 can provide a modular hearing device 12.

Figure 5:
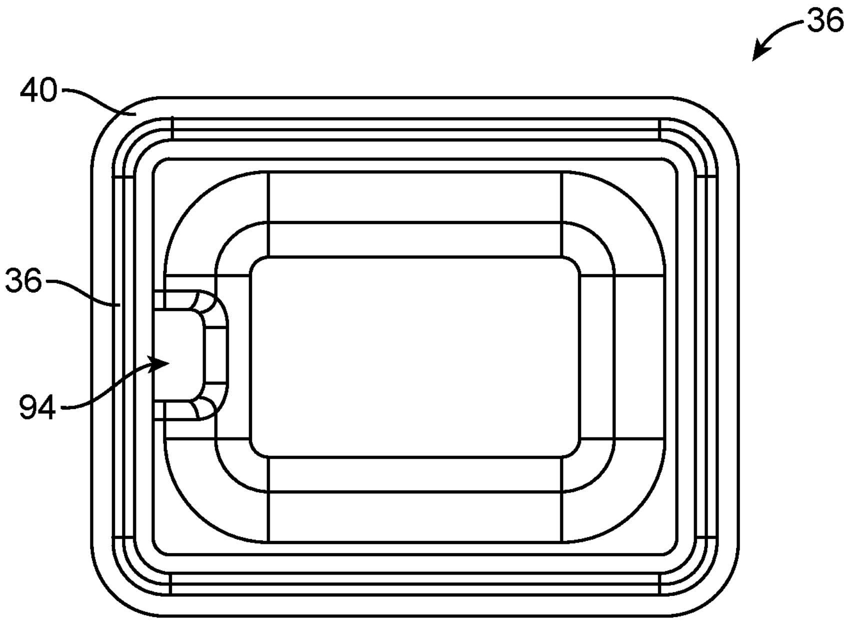
FIG. 5 is a schematic plan view of the isolator of FIG. 4.
Figure 6:
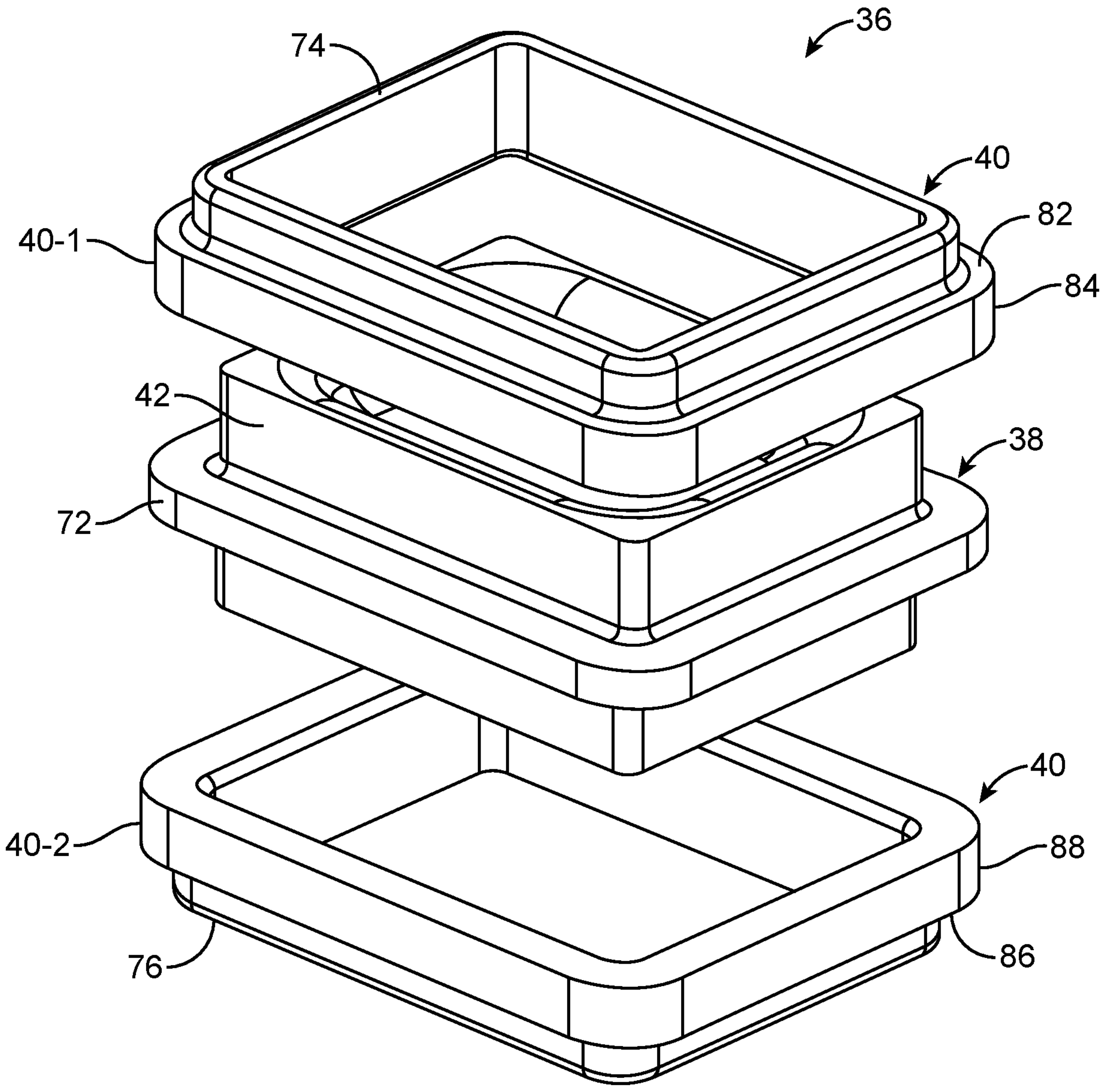
FIG. 6 is an exploded view of the isolator of FIG. 4.

As shown in FIGS. 4-6, the isolator 36 includes the body 38 and the sleeve 40 disposed on the body. In one or more embodiments, the sleeve 40 is disposed on the side surface 42 of the body 38. In one or more embodiments, the second end 30 of the front housing 24 can be connected to the sleeve 40 of the isolator 36 using any suitable technique. Further, in one or more embodiments, the second end 34 of the rear housing 26 can be connected to the sleeve 40 of the isolator 36 using any suitable technique.

The body 38 of the isolator 36 can take any suitable shape and have any suitable dimensions. In one or more embodiments, the body 38 can include one or more flanges 72 that extend from the side surface 42. The sleeve 40 can be in contact with the flange 72. In one or more embodiments, the sleeve 40 abuts the flange 72.

The body 38 can include any suitable material, e.g., the same materials described herein regarding the front and rear housings 24, 26. In one or more embodiments, the body 38 includes the same material as at least one of the front housing 24 or the rear housing 26. In one or more embodiments, the body 38 includes a material that is different from a material of at least one of the front housing 24 or the hearing housing 26. In one or more embodiments, the body 38 of the isolator 36 includes a thermoplastic elastomer.

The body 38 of the isolator 36 can exhibit any desirable hardness value. In one or more embodiments, the hardness value of the body 38 is at least 20 durometer Shore OO. In one or more embodiments, the hardness value of the body 38 is no greater than 80 durometer Shore A. Further, the sleeve 40 of the isolator 36 can exhibit any desirable hardness value. In one or more embodiments, the hardness value of the sleeve 40 is at least 10 durometer Shore D. In one or more embodiments, the hardness value of the sleeve 40 is no greater than 100 durometer Shore D. In one or more embodiments, the hardness value of the sleeve 40 of the isolator 36 is greater than the hardness value of the body 38 of the isolator.

The sleeve 40 of the isolator 36 can be connected to any suitable portion or portions of the body 38. Although depicted as being connected to the side surface 42 of the body 38, the sleeve 40 can be connected to one or more additional surfaces of the body 38. Further, the sleeve can be connected to the body 38 using any suitable technique, e.g., bonding, adhering including adhesive bonding and adhesive tapes, welding, friction-fitting, snap fitting, etc. In one or more embodiments, the sleeve 40 can be over-molded onto one or more portions of the body 38, e.g., onto the side surface 42 of the body.

The sleeve 40 can be a unitary component or include two or more portions. For example, as shown in FIGS. 4 and 6, the sleeve 40 includes a first portion 40-1 and a second portion 40-2 (collectively referred to as sleeve 40). The first portion 40-1 can be connected to the front housing 24 and the second portion 40-2 can be connected to the rear housing 26. The flange 72 of the body 38 can be disposed between the first portion 40-1 and the second portion 40-2.

The sleeve 40 can also include a first rib 74 and a second rib 76. The first rib 74 extends towards the first end of 28 of the front housing 24 along the enclosure axis 2, and the second rib 76 extends towards the first end 32 of the rear housing 26 along the enclosure axis (FIG. 3). Each of the first and second ribs 74, 76 can take any suitable shape. In one or more embodiments, the first rib 74 is adapted to be inserted into the second end 30 of the front housing 24 and the second rib 76 is adapted to be inserted into the second end 34 of the rear housing 26. In one or more embodiments, the second end 30 of the front housing 24 can include a slot 78 (FIG. 3) that is adapted to receive the first rib 74 of the sleeve 40. Further, in one or more embodiments, the second end 34 of the rear housing 26 can include a slot 80 that is adapted to receive the second rib 76.

The sleeve 40 of the isolator 36 can also include a first ledge 82 that extends from the first rib 74 to a first perimeter 84 of the sleeve. As shown in FIG. 6, the first ledge 82 is disposed on the first portion 40-1 of the sleeve. Further, the sleeve 40 can also include a second ledge 86 that extends from the second rib 76 to a second perimeter 88 of the sleeve. As is also shown in FIG. 6, the second ledge 86 is disposed on the second portion 40-2 of the sleeve. An end surface 90 (FIG. 3) of the second end 30 of the front housing 24 is adapted to engage the first ledge 82 when the front housing is connected to the isolator 36. Further, an end surface 92 of the second end 34 of the rear housing 26 is adapted to engage the second ledge 86 when the rear housing is connected to the isolator 36.

Although the isolator 36 is depicted as including the sleeve 40, in one or more embodiments, the isolator can include only the body 38 disposed between the front housing 24 and the rear housing 26 as is further described in related U.S. Provisional Patent Application No. 63/320,017, entitled HEARING DEVICE.

In one or more embodiments, the body 38 of the isolator 36 includes an opening 94 (FIGS. 4-5) that can take any suitable shape and have any suitable dimensions. One or more conductors (not shown) can extend from at least one of the connector port 68 or the microphone 44 through the opening 94 such that the receiver 46 can be electrically connected to at least one of the one or more electronic components 20 disposed in the hearing module 14 via the cable 16 (or wirelessly) or the microphone.

The microphone 44 can include any suitable microphone or microphones, e.g., a MEMS microphone, an electret condenser microphone, conjoined microphone sets, etc. In one or more embodiments, the microphone 44 can instead be any suitable sensor or sensors, e.g., at least one of a temperature, optical, or tactile sensor. The microphone 44 can be disposed in any suitable location within the rear housing 26. Further, the microphone 44 can be oriented in any suitable position within the rear housing 26 such that the inlet 96 of the microphone is acoustically connected to the outlet 56 of the microphone port 52 (FIG. 3) using any suitable technique.

Such microphone port 52 can take any suitable shape and have any suitable dimensions. In one or more embodiments, the microphone port 52 can be nano-coated to resist debris and moisture ingress. The inlet 54 of the microphone port 52 can take any suitable shape and have any suitable dimensions. Further, the inlet 54 can be disposed in any suitable portion or portions of the rear housing 26. As shown in FIG. 2, the inlet 54 is disposed in a side surface 31 of the rear housing 26 and the first end 32 of the rear housing. In one or more embodiments, the inlet 54 can be disposed entirely within the side surface 31 of the rear housing 26 or entirely within the first end 32 of the rear housing. The microphone port 52 can include any suitable number of inlets 54 and outlets 56. As shown in FIG. 2, the microphone port 52 includes a second inlet 55 disposed in a second side surface 33 of the rear housing 26 and the first end 32 of the rear housing. In one or more embodiments, the second inlet 55 can be disposed entirely within the second side surface 33 or entirely within the first end 32 of the rear housing 26. The inlet 54 and second inlet 55 can be acoustically connected to the same microphone port 52. In one or more embodiments, the inlet 54 can be acoustically connected to the microphone port 52 and the second inlet 55 can be connected to a second microphone port (not shown) that is acoustically connected to the microphone 44.

The microphone port 52 can be a vented microphone port that remains acoustically open to an ambient environment of the hearing device 12. In one or more embodiments, the hearing device 12 can include a valve that can at least partially occlude the microphone port 52 such that acoustic energy from the ambient environment is at least partially obstructed from reaching the microphone 44. Any suitable valve can be utilized to at least partially occlude the microphone port 52. Further, the valve can be disposed in any suitable location relative to the microphone port 52. In one or more embodiments, the valve can be disposed within the microphone port 52. Such valve can be adapted to prevent ingress of fluid or debris into the microphone port 52 and to an interior of the enclosure 22 of the hearing device 12.

The receiver 46 can be disposed in any suitable location within the front housing 24. Such receiver 46 can include any suitable receiver or receivers, e.g., a balanced armature speaker, dynamic driver speaker, piezo electric speaker, etc. The receiver 46 is acoustically connected to the opening 50 by the acoustic port 48. The acoustic port 48 can take any suitable shape and have any suitable dimensions.

Returning to FIG. 1, the hearing module 14 can be adapted to be disposed between the ear and the skull of the wearer. The hearing module 14 includes the module housing 18 and electronic components 20 (FIG. 7) disposed within the module housing. The electronic components 20 of the hearing module 14 can include any suitable electronic component or circuitry, e.g., at least one of a controller, an integrated circuit, a power source, a microphone, or a speaker (i.e., receiver). In one or more embodiments, the electronic components 20 of the hearing module 14 can be electrically connected to the hearing device 12 by the cable 16. Further, in one or more embodiments, the electronic components 20 can be connected to the hearing device 12 by a wireless connection using any suitable wireless technique In one or more embodiments, the electronic components 20 of the hearing module 14 can include a controller 21 that is operatively connected to the hearing device 12 using any suitable technique, e.g., by the cable 16. In one or more embodiments, the controller 21 can be adapted to direct a noise canceling signal to the receiver 46 of the hearing device 12 that is based upon a noise signal received from the microphone 44 using any suitable technique. The receiver 46 is adapted to direct a noise canceling acoustic wave into the ear canal of the wearer that is based upon this noise canceling signal from the controller 21.

Figure 8:
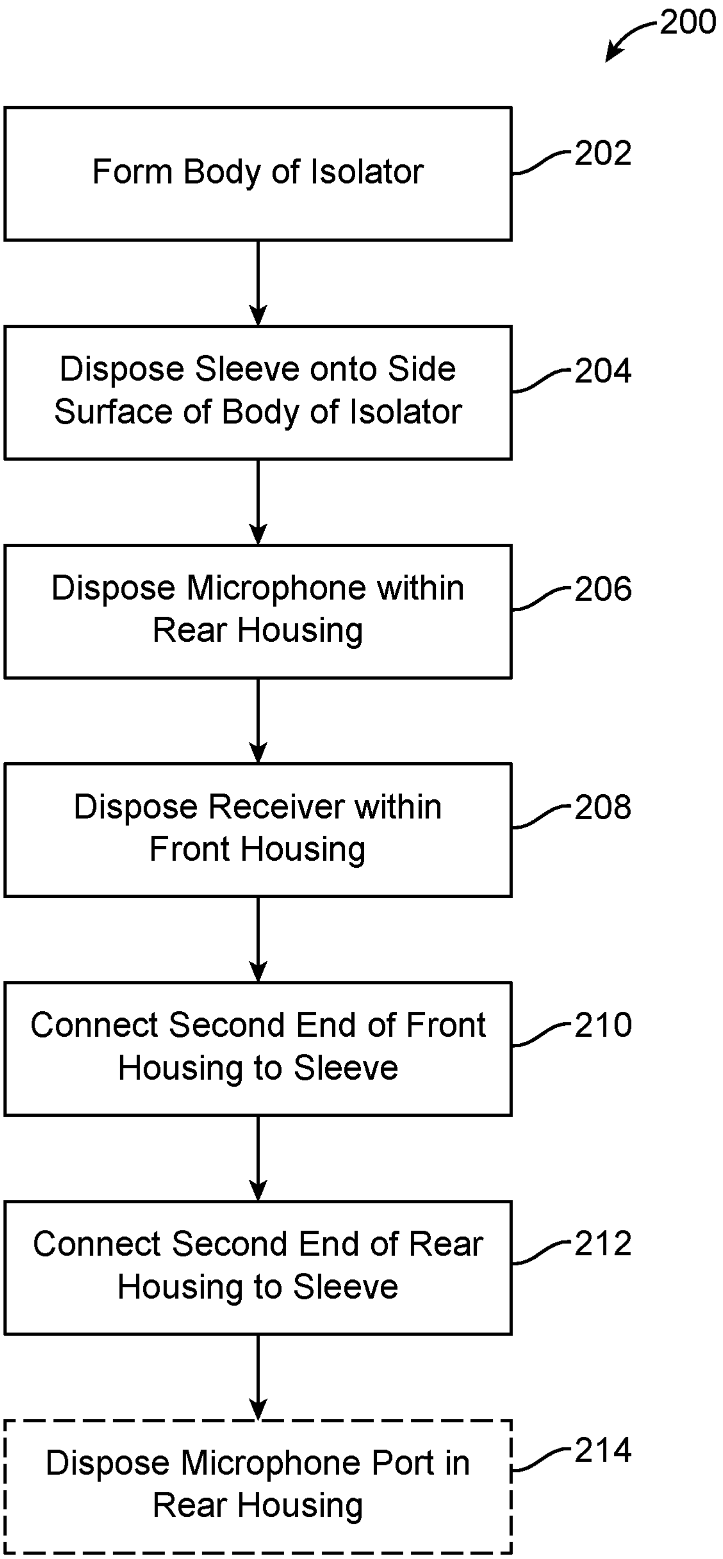
FIG. 8 is a flowchart of a method of forming the hearing device of FIG. 1.

Any suitable technique can be utilized to form the various embodiments of hearing devices described herein. For example, FIG. 8 is a flowchart of one embodiment of a method 200 of forming the hearing device 12. Although described regarding the hearing device 12 of FIGS. 1-7, the method 200 can be utilized to form any suitable hearing device.

At 202, the body 38 of the isolator 36 can be formed using any suitable technique, e.g., molding. The sleeve 40 can be disposed on the body 38 (e.g., on the side surface 42 of the body) of the isolator 36 at 204 using a suitable technique, e.g., the sleeve can be over-molded onto the body of the isolator. Although not shown, in one or more embodiments, the opening 94 can be disposed through the body 38 of the isolator 36 using any suitable technique. Further, the microphone 44 can be disposed at least partially within the rear housing 26 at 206. At 208, the receiver 46 can be disposed within the front housing 24. The second end 30 of the front housing 24 can be connected to the sleeve 40 of the isolator 36 at 210 using any suitable technique. For example, in one or more embodiments, the end surface 90 of the front housing 24 can be adhered to the rib 74 of the first portion 40-1 of the sleeve 40 using any suitable adhesive. Further, at 212, the second end 34 of the rear housing 26 can be connected to the sleeve 40 of the isolator 36 using a suitable technique. For example, in one or more embodiments, the end surface 92 of the second end 34 of the rear housing 26 can be adhered to the rib 76 of the second portion 40-2 of the sleeve 40 using any suitable adhesive. At 214, the microphone port 52 can optionally be disposed within the rear housing 26 using any suitable technique.

All references and publications cited herein are expressly incorporated herein by reference in their entirety into this disclosure, except to the extent they may directly contradict this disclosure. Illustrative embodiments of this disclosure are discussed and reference has been made to possible variations within the scope of this disclosure. These and other variations and modifications in the disclosure will be apparent to those skilled in the art without departing from the scope of the disclosure, and it should be understood that this disclosure is not limited to the illustrative embodiments set forth herein. Accordingly, the disclosure is to be limited only by the claims provided below.

What is claimed is:

1. A hearing device comprising:

an enclosure extending along an enclosure axis and comprising a front housing and a rear housing, wherein the front housing extends along the enclosure axis between a first end and a second end, wherein the first end is adapted to be disposed at least partially within an ear canal of a wearer, and further wherein the rear housing extends along the enclosure axis between a first end and a second end;

an isolator disposed between the front housing and the rear housing, wherein the isolator comprises a body and a sleeve disposed on a side surface of the body, wherein the second end of the front housing and the second end of the rear housing are connected to the sleeve of the isolator, wherein a hardness value of the sleeve of the isolator is greater than a hardness value of the body of the isolator;

a microphone disposed in the rear housing;

a microphone port extending between an inlet disposed in the rear housing and an outlet that is acoustically connected to an inlet of the microphone;

a receiver disposed in the front housing; and an acoustic port extending between the receiver and an opening disposed in the first end of the front housing, wherein the acoustic port acoustically connects the receiver to the opening.

2. The device of claim 1, wherein the sleeve is over-molded onto the side surface of the body of the isolator.

3. The device of claim 1, wherein the isolator further comprises a flange that extends from the side surface, wherein the sleeve is in contact with the flange.

4. The device of claim 3, wherein the sleeve comprises a first portion that is connected to the front housing and a second portion that is connected to the rear housing, wherein the flange is disposed between the first portion and the second portion of the sleeve.

5. The device of claim 1, wherein the body of the isolator comprises at least one of a thermoplastic polymer, thermoset polymer, thermoplastic elastomer, or photopolymer.

6. The device of claim 1, wherein the body of the isolator comprises a hardness value of at least 20 durometer Shore OO and no greater than 80 durometer Shore A.

7. The device of claim 1, further comprising an earbud connected to the first end of the front housing.

8. The device of claim 1, wherein the sleeve of the isolator further comprises a first rib that extends toward the first end of the front housing along the enclosure axis, wherein the first rib is adapted to be inserted into the second end of the front housing.

9. The device of claim 8, wherein the sleeve of the isolator further comprises a second rib extending toward the first end of the rear housing along the enclosure axis, wherein the second rib is adapted to be inserted into the first end of the rear housing.

10. The device of claim 9, wherein the sleeve of the isolator further comprises a ledge that extends from the first rib to a perimeter of the sleeve, wherein an end surface of the second end of the front housing is adapted to engage the ledge.

11. The device of claim 10, wherein the sleeve of the isolator further comprises a second ledge that extends from the second rib to the perimeter of the sleeve, wherein an end surface of the second end of the rear housing is adapted to engage the ledge.

12. The device of claim 1, further comprising a connector port disposed in the first end of the rear housing and adapted to receive an end of a cable.

13. A hearing device system comprising:

a hearing device comprising:

an enclosure extending along an enclosure axis and comprising a front housing and a rear housing, wherein the front housing extends along the enclosure axis between a first end and a second end, wherein the first end is adapted to be disposed at least partially within an ear canal of a wearer, and further wherein the rear housing extends along the enclosure axis between a first end and a second end;

an isolator disposed between the front housing and the rear housing, wherein the isolator comprises a body and a sleeve disposed on a side surface of the body, wherein the second end of the front housing and the second end of the rear housing are connected to the sleeve of the isolator;

a microphone disposed in the rear housing;

a microphone port extending between an inlet disposed in the rear housing and an outlet acoustically connected to an inlet of the microphone;

a receiver disposed in the front housing; and an acoustic port extending between the receiver and an opening disposed in the first end of the front housing, wherein the acoustic port acoustically connects the receiver to the opening;

a hearing module adapted to be disposed between an ear and a skull of the wearer, wherein the hearing module comprises a module housing and electronic components disposed within the module housing; and a cable that connects the hearing device to the hearing module.

14. The system of claim 13, wherein the electronic components of the hearing module comprise a controller that is operatively connected to the hearing device.

15. The system of claim 14, wherein the controller is adapted to direct a noise canceling signal to the receiver of the hearing device that is based upon a noise signal received from the microphone of the hearing device, wherein the receiver is adapted to direct a noise canceling acoustic wave into an ear canal of a wearer of the hearing device that is based upon the noise canceling signal from the controller.

16. A method comprising:

forming a body of an isolator;

overmolding a sleeve onto a side surface of the body of the isolator;

disposing a microphone at least partially within a rear housing, wherein the rear housing comprises a first end and a second end;

disposing a receiver within a front housing, wherein the front housing comprises a first end and a second end, wherein the first end is adapted to be disposed at least partially within an ear canal of a wearer;

connecting the second end of the front housing to the sleeve of the isolator; and connecting the second end of the rear housing to the sleeve of the isolator, wherein the front housing, the isolator, and the rear housing define an enclosure that extends along an enclosure axis.

17. The method of claim 16, further comprising disposing a microphone port in the rear housing that extends between an inlet disposed in the rear housing and an outlet disposed adjacent to the microphone.

18. The method of claim 16, wherein forming the body of the isolator comprises molding the body of the isolator.

19. The system of claim 13, wherein the isolator of the hearing device further comprises a flange that extends from the side surface, where the sleeve is in contact with the flange.

20. The system of claim 19, wherein the sleeve comprises a first portion that is connected to the front housing and a second portion that is connected to the rear housing, wherein the flange is disposed between the first portion and the second portion of the sleeve.

* * * * *